W. GAERTNER.
SPRING CLAMP.
APPLICATION FILED APR. 22, 1912.
1,052,234.
Patented Feb. 4, 1913.
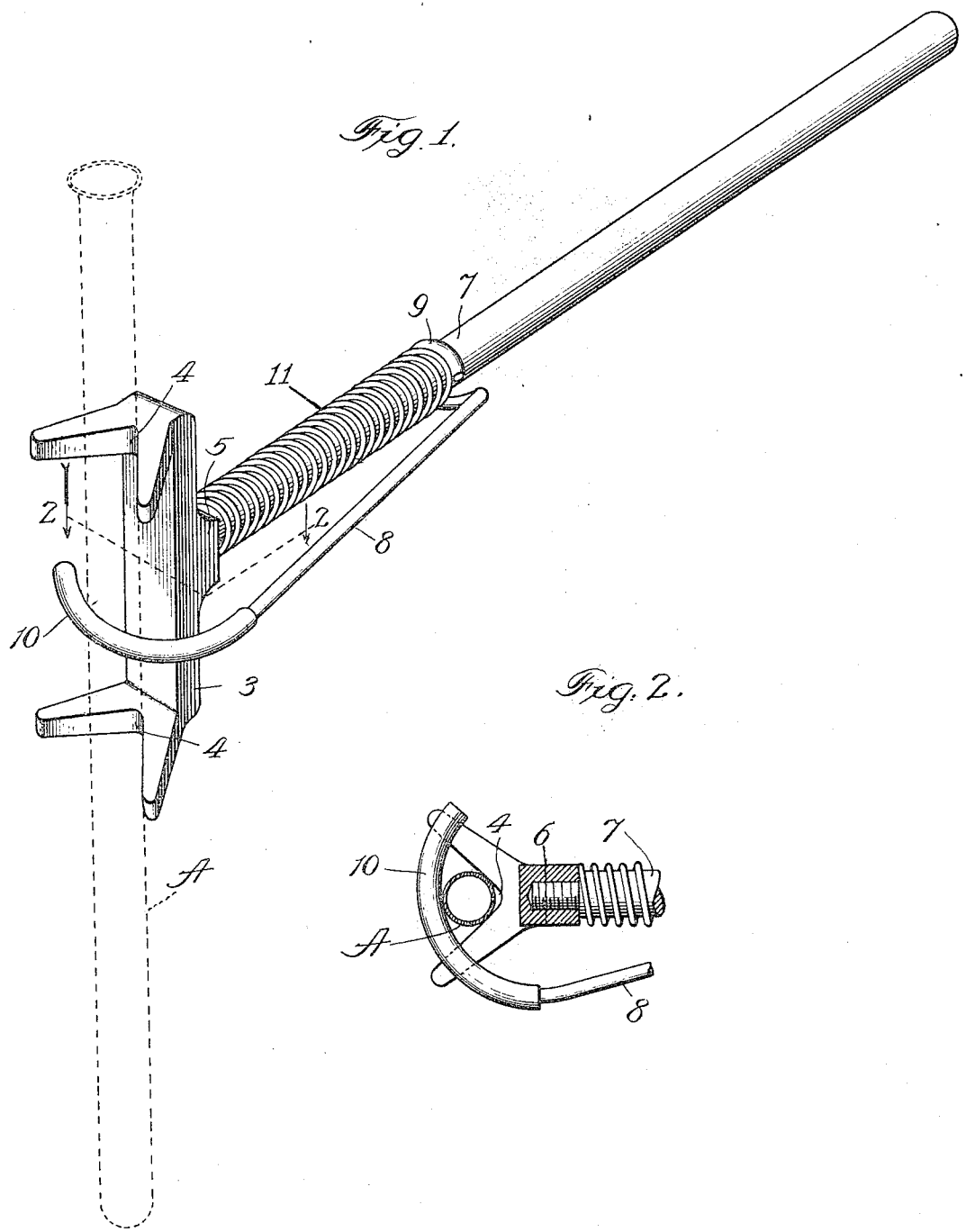

UNITED STATES PATENT OFFICE.

WILLIAM GAERTNER, OF CHICAGO, ILLINOIS.

SPRING-CLAMP.

1,052,234.

Specification of Letters Patent.

Patented Feb. 4, 1913.

Application filed April 22, 1912. Serial No. 692,436.

*To all whom it may concern:*

Be it known that I, WILLIAM GAERTNER, a citizen of the United States, residing at Chicago, in the county of Cook and State of Illinois, have invented a new and useful Improvement in Spring-Clamps, of which the following is a specification.

The object of my invention is to provide a simple construction of spring clamp, more especially for laboratory use, which shall peculiarly adapt it for convenient use in holding firmly and without danger of injury all kinds of small apparatus, such as thermometers, burettes, telescopes, and the like, within the range of the clamp, the preferred size for which is 40 m. m.

In the accompanying drawings, Figure 1 shows my improved device, in its preferred form, by a perspective view, and Fig. 2 is a broken section on line 2—2, Fig. 1.

The head 3 is formed at its ends with similar crotch-like seats 4, 4, preferably of the V-shape illustrated, for a burette A or other small laboratory apparatus. Centrally on the back of the head is an internally threaded socket 5 to receive a screw 6 on one end of a stem 7, which may be prolonged, as shown, to form the handle of the device, though a handle may extend from any desired part of the head. The clamp 8 is a rod having a ring 9 formed on one end to surround loosely the stem, and bent at its opposite end, preferably into the form of a curved finger, which is shown covered by a sheath 10 of cushioning material, preferably soft rubber, and which crosses the head between the end-seats 4 thereon. A spiral spring 11 is confined about the stem between the ring 9 and socket 5.

To use the device, the user, holding it by the handle, may use the hand holding it to press the ring 9 against the resistance of the spring to advance the rod 8 and thereby move the finger thereon from the head to withdraw it from obstructing the placing, with his other hand, of a burette A, thermometer, or the like, in the seats 4, whereupon releasing the pressure against the ring frees the spring to retract it and clamp the finger against the section of the seated article in its path, thereby firmly holding it in place. The release of the article is as readily accomplished upon again pressing the ring against the spring-resistance.

The loose fit of the ring 9 about the stem 7 permits it to be swung to a limited extent, as on a pivot, to shift the position of the clamping finger along the clamped article, so that if the latter be, for example, a thermometer, which the finger happens, in clamping, to cover at a point to which inspection should be directed and thus obstructs the inspection, the finger may easily be shifted sufficiently to uncover that point.

What I claim as new and desire to secure by Letters Patent is—

1. A spring-clamp of the character described, comprising, in combination, a head provided with seat-forming end-crotches, a stem extending from the head between its ends, a rod having at one end a connection with the stem movable lengthwise thereon and formed at its opposite end with a clamping-finger extending across the head between said crotches, and a spiral spring confined between the movable rod-connection therewith and the head to yieldingly hold said finger in clamping engagement with the head.

2. A spring-clamp of the character described, comprising, in combination, a head provided with seat-forming V-shaped end-crotches, a handle-forming stem connected with the back of the head between its ends, a rod having a ring on one end loosely surrounding the stem and movable lengthwise thereof, and formed at its opposite end with a curved clamping-finger extending across the head between said crotches, a cushioning sheath on said finger, and a spiral spring confined about the stem between said ring and head to yieldingly hold said finger in clamping engagement with the head.

WILLIAM GAERTNER.

In presence of—
   L. HEISLAR,
   R. SCHAEFER.